Figure 1:
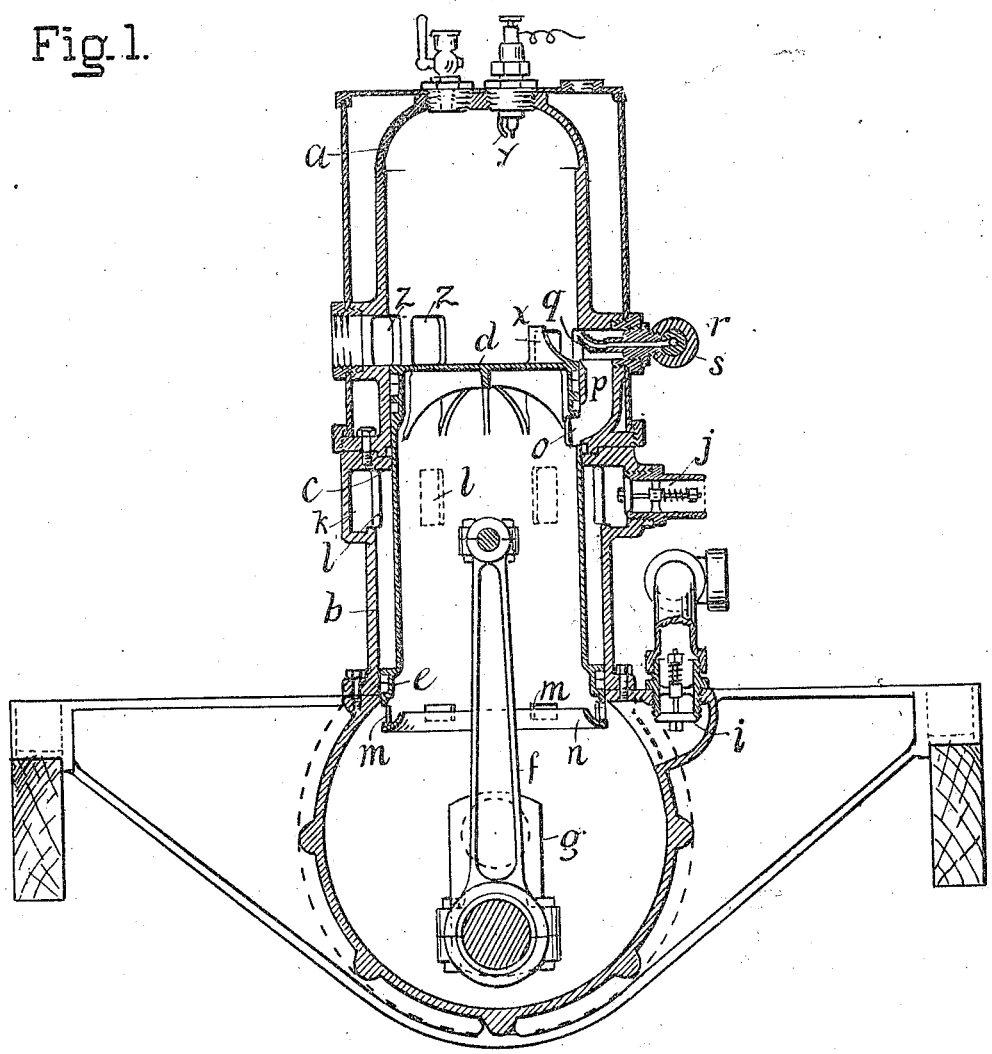

W. HARPER, Jr.
INTERNAL COMBUSTION ENGINE.
APPLICATION FILED DEC. 12, 1906. RENEWED OCT. 30, 1912.

1,121,584.

Patented Dec. 15, 1914.

3 SHEETS—SHEET 1.

Witnesses:
Samuel W. Balch
David Neil Hooper

Inventor,
William Harper, Jr,
by Thomas Ewing Jr,
Attorney.

UNITED STATES PATENT OFFICE.

WILLIAM HARPER, JR., OF NEW BLOOMFIELD, PENNSYLVANIA, ASSIGNOR, BY MESNE ASSIGNMENTS, OF THREE-TENTHS TO HARPER ENGINEERING COMPANY, A CORPORATION OF NEW YORK, AND SEVEN-TENTHS TO THOMAS A. NEVINS, OF EAST ORANGE, NEW JERSEY.

INTERNAL-COMBUSTION ENGINE.

1,121,584.  Specification of Letters Patent.  Patented Dec. 15, 1914.

Application filed December 12, 1906, Serial No. 347,430. Renewed October 30, 1912. Serial No. 726,728.

*To all whom it may concern:*

Be it known that I, WILLIAM HARPER, Jr., a citizen of the United States of America, and a resident of New Bloomfield, Perry county, Pennsylvania, have invented certain new and useful Improvements in Internal-Combustion Engines, of which the following is a specification.

This invention relates particularly to explosive engines of the two-cycle type, having means exterior to the power-chamber of the engine for the compression of the incoming charge. This means comprises a chamber in a cylinder tandem with and of larger diameter than the cylinder containing the power-chamber. The cylinders are traversed by a piston which fits both and forms with the smaller cylinder a power-chamber, with the larger cylinder together with the crank-case the main compression-chamber, and between the walls of the piston and the walls of the larger cylinder an annular compression-chamber.

The object of the invention is to utilize in such a structure the annular cylinder space above indicated as an additional compression-chamber.

A further object of the invention is to provide a passageway whereby the air which is compressed in the annular compression-chamber is added to the air which is drawn directly into the main compression-chamber, whereby both may be then transferred to the power-chamber through the same passageway.

A further object of the invention is to provide such a passageway for the transfer of the air to the power-chamber which is in part through the interior of the piston.

A further object of the invention is to so direct this passageway that the incoming air will cool the piston-head and other walls of the piston and parts provided for the conduction and radiation of heat therefrom.

A further object of the invention is to provide a compressed stratified charge of air and compressed air and gas in excess of the capacity of the power-chamber and to admit the component parts of the charge to the power-chamber in succession so that the exploded charge of the preceding operation of the engine will be completely scavenged by the air before the explosive portions of the charge pass into the power-chamber.

A further object of the invention is to utilize the interior of the piston as a storage chamber in which air may be retained while added to the charge of air and gas in the main chamber and thereby stratified from the charge of air and gas so that the pure air admitted from the annular compression-chamber will be first passed into the power chamber.

A further object of the invention is to provide for the introduction of a fuel charge, as crude oil, into the compressed charge of gas or air or mixed gas and air after the air has received the low compression in the compression-chambers, but before final compression in the power-chamber, and to direct the atomized fuel against a heated deflecting plate carried by the piston in the power-chamber.

Figure 2:
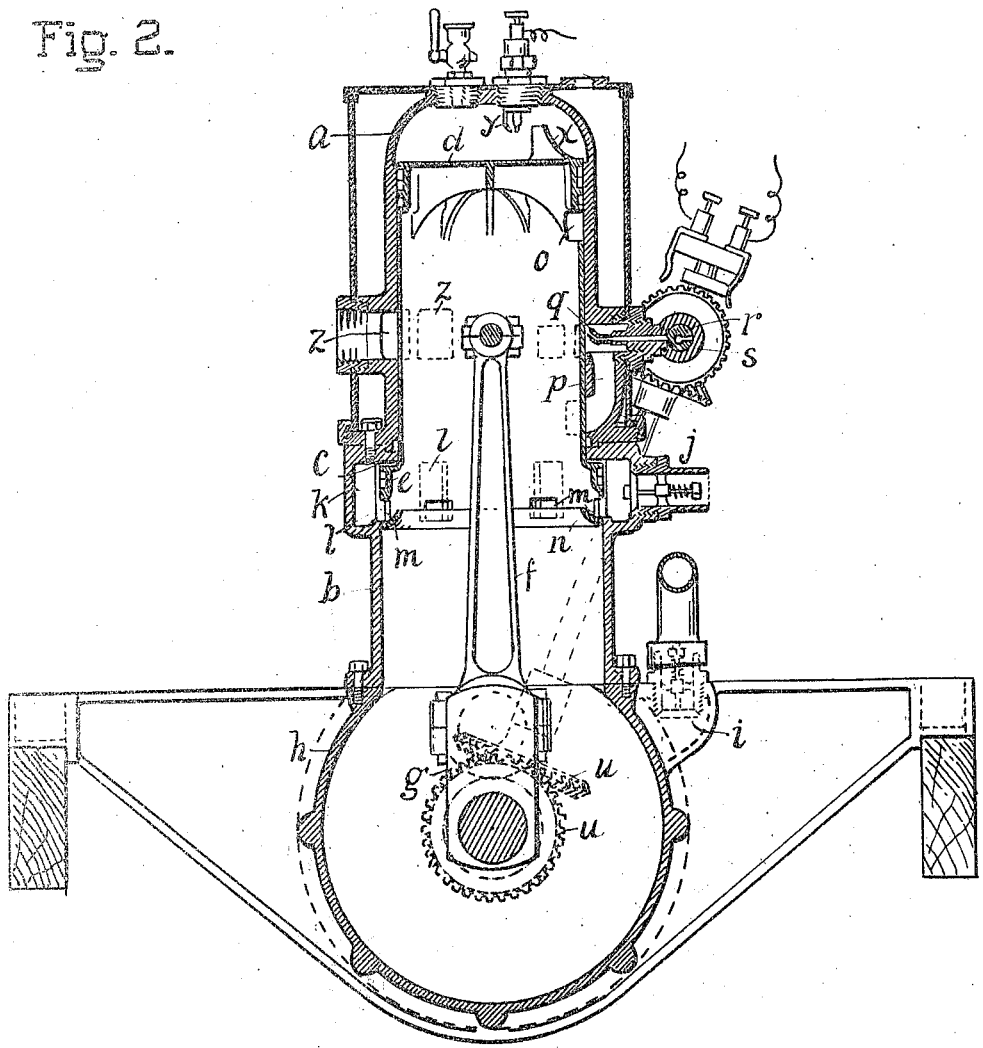
Figure 3:
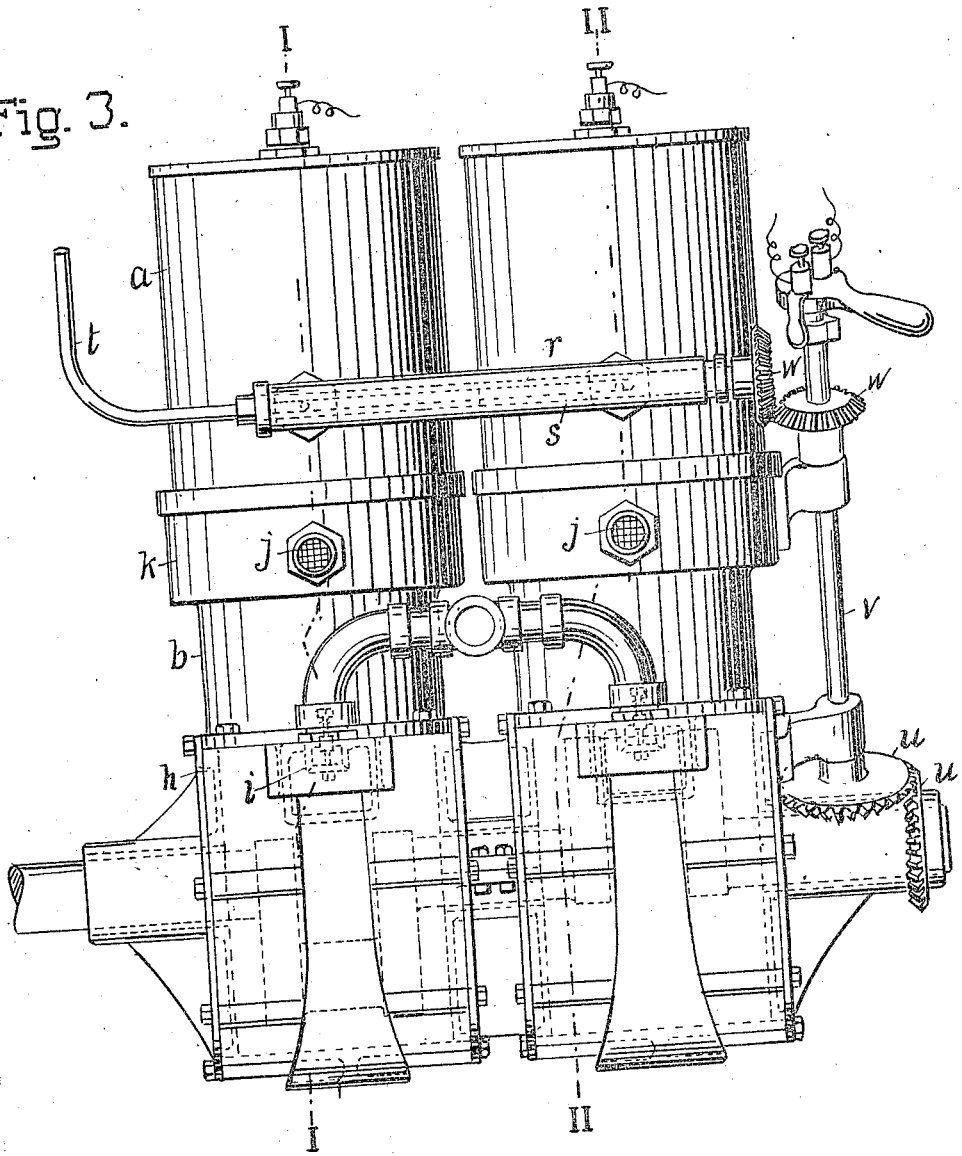

In the accompanying three sheets of drawings, which form a part of this application, Figure 1 is a longitudinal section through an engine unit embodying my invention, on the line I—I of Fig. 3, showing the position of the parts at the end of a power stroke. Fig. 2 is a longitudinal section on the line II—II of Fig. 3 of a companion engine unit of identical design, showing the position of the parts immediately before or upon ignition. Fig. 3 is an elevation showing two engine units operating a common crank shaft.

The engine casing comprises a cylinder *a* closed at the top and underneath a cylinder *b* of larger internal diameter tandem with the first cylinder, the cylinders hermetically jointing and leaving a step *c* at the point of juncture owing to their difference in diameter. Both cylinders are traversed by a hollow piston consisting of a head *d* fitting the smaller cylinder, and a head *e* fitting the larger cylinder. A connecting rod *f* connects the piston with the crank shaft *g* of the engine. The larger cylinder is closed in effect by the crank-case *h*. Three chambers are formed by the cylinders and piston: Above the piston and in the smaller cylinder is formed the power-chamber; below the piston and in the larger cylinder and the crank-case is formed the main compression-chamber which also takes in the crank-case space and the interior of the piston; and between the walls of the piston and the walls of the larger cylinder is formed an annular compression-chamber.

The charge for the engine is drawn into the two compression-chambers through check-valves $i$ $j$ in the inlet ports of the main compression-chamber and of the annular compression-chamber respectively. Air or a combustible mixture is admitted through the valve $i$ into the main compression-chamber, and air only is admitted through the valve $j$ into the annular compression-chamber.

A clearance chamber $k$ is formed around the upper end of the larger cylinder and is in unobstructed communication through ports $l$ $l$ with the upper end of the annular chamber so that it is in effect a clearance space for the annular compression-chamber which is afforded without lengthening the chamber for the purpose.

Ports $m$ $m$ at the lower edge of the rim of the piston come into communication with the ports of the clearance chamber when the piston nears the upper point of its stroke and permit the escape of the compressed air to the interior of the piston and the compression-chamber of the larger cylinder, the clearance chamber and its ports being in effect a communicating port between the compression-chambers.

A deflector $n$ is opposite the ports in the lower edge of the rim of the piston and is formed so as to direct the inrushing air upwardly to the top of the chamber in the piston.

Near the end of the piston adjoining the power-chamber is a port $o$ which is brought, when the piston is at the bottom of its stroke, opposite a passageway $p$ leading into the power-chamber and forming a communicating port from the comprission-chamber of the larger cylinder into the power-chamber which lies in part through the piston and in contact with the walls thereof. An oil-nozzle $q$ is located in this port and sprays oil into the draft of the incoming charge to the power cylinder. The oil is delivered to the nozzle through a hollow feed shaft $r$ which is revolved in a casing $s$, and the casing is supplied with oil under pressure through a pipe $t$. A port in the side of the feed shaft is brought opposite the nozzle at the required moment in each revolution. The feed shaft is revolved in synchronism with the crank-shaft through transmitting mechanism consisting of miter gears $u$ $u$, a connecting shaft $v$ and miter gears $w$ $w$. In the event of a number of engine units being connected to the crank-shaft, ports are provided in the feed shaft in proper angular position for the admission of oil at the proper moment to the nozzle of each engine unit.

The port containing the nozzle is so shaped that the air passing therethrough will be directed and will carry the oil against a plate $x$ which is mounted on the piston-head in the power-chamber. The charge is exploded by a spark from a spark-plug $y$. Exhaust ports $z$ $z$ are located in the walls of the power-chamber where they will be uncovered at the proper time by the piston.

In describing the operation of the engine, attention will be directed first to the induction and compression of the parts forming the same explosive charge. Commencing with the piston of the engine in the position illustrated in Fig. 2, on descent of the piston, air is drawn into the annular compression-chamber through the valve $j$, and this chamber will be filled with air at atmospheric pressure when the piston reaches this position, and the air will cool the piston walls which have become heated through contact with the walls of the power-chamber and the exploded gases contained therein. On the return stroke this air is compressed and driven into the clearance chamber while concurrently, air or mixed air and gas, is drawn through the valve $i$ and the crank-case into the main compression-chamber. At the conclusion of this stroke the ports near the lower edge of the rim of the piston are brought opposite the ports into the clearance chamber, thereby releasing the air in the clearance chamber and permitting it and any further air which may be driven from the annular compression-chamber into the clearance chamber to pass into the piston and become added to the air or mixed air and gas drawn into the main compression-chamber through the valve in the crank-case. By reason of impact against the deflector in the piston, the air is directed upwardly along the interior side walls of the piston in such manner that it will displace or drive before it the residual gas left in the piston from the preceding stroke. The residual gas passes down through the middle of the piston while the pure air accumulates at the top in contact with the end of the piston which forms the movable wall of the power-chamber, thereby cooling this wall and remaining stratified from the mixture of gas and air which is driven into the lower portion of the piston, and the other parts of the main compression-chamber. On the next stroke, which is down, the pure air and the mixture while remaining stratified, are compressed in the several parts of the main compression-chamber. At the conclusion of the stroke the port near the head of the piston in the power-chamber comes opposite the port leading into the power-chamber and the compressed stratified charge rushes into the power-chamber. The air entering first displaces the exploded gases, scavenges the power-chamber, and lowers the temperature of the chamber walls sufficiently to prevent premature firing by the heat of the walls. Then follows the charge of gas and it mixes in the power-chamber with such air as does not follow the exploded gases out through the exhaust ports. As this takes place, oil is admitted to the nozzle, and as it flows therefrom the oil is atomized by the air and gas passing through the passageway and any oil which may not be vaporized at the nozzle is carried against the deflector mounted on top of the piston. As both sides of this deflector are always within the power-chamber, it becomes and remains much hotter than the other parts of the power-chamber, and vaporizes the liquid particles of oil which may be carried against it. In passing into the power-chamber the incoming charge is first deflected to the top of the chamber on the side opposite the exhaust ports so that it will be kept stratified from the exploded charge and displace and expel or scavenge the latter through the exhaust ports. The exhaust ports are properly adjusted in size or throttled so that this scavenging of the power-chamber will require about the length of time that the ports of the chamber remain open. The following up-stroke traps the charge in the power-chamber under the initial pressure imparted to it in the compression-chambers and compresses it further preparatory to its explosion at the commencement of the next stroke down.

It will be seen that there are six operations, each occupying a stroke in one or the other of the three chambers, viz: induction in the annular compression-chamber, compression in the annular compression-chamber, induction in the main compression-chamber, compression in the main compression-chamber, compression in the power-chamber and explosion and expansion in the power-chamber. As one or the other takes place in each of the three chambers at each stroke, it follows that all of the operations are taken, though not for the same explosive charge, in each two strokes or each revolution of the engine, and hence the engine may be termed a two-cycle engine, or an engine in which the operations reoccur at each two strokes, although five strokes had to be considered in tracing the complete transit of the component parts of an explosive charge through the several chambers of the engine.

Reference is here made to my earlier application filed June 20, 1906, original Serial No. 322,566, renewed October 30, 1912, renewal Serial No. 728,727 wherein claims are made which read upon the structure herein shown and which are not restricted to a structure in which the gases are conducted through a piston in contact with the walls thereof.

What I claim as new and desire to secure by Letters Patent of the United States is:

1. An internal combustion engine comprising tandem communicating cylinders of different diameters, a piston fitting both cylinders and forming a power-chamber in the smaller cylinder, a compression-chamber in the larger cylinder, and an annular compression-chamber between the walls of the piston and the walls of the larger cylinder, inlet ports for both compression-chambers, a communicating port between the compression-chambers, a communicating port between the compression-chamber of the larger cylinder and the power-chamber which is independent of the annular chamber and includes a passageway through the piston formed wholly by the walls thereof whereby the gases are conducted through the piston in contact with the walls thereof, and an exhaust port for the power-chamber, substantially as described.

2. An internal combustion engine comprising tandem communicating cylinders of different diameters, a hollow piston the entire interior of which is in free communication with the larger cylinder and fitting both cylinders and forming a power-chamber in the smaller cylinder, a compression-chamber in the larger cylinder and interior of the piston, and an annular compression-chamber between the walls of the piston and the walls of the larger cylinder, inlet ports for both compression-chambers, a communicating port between the compression-chambers, a communicating port between the compression-chamber of the larger cylinder and the power-chamber which is independent of the annular chamber, and an exhaust port for the power-chamber, substantially as described.

3. An internal combustion engine comprising tandem communicating cylinders of different diameters, a hollow piston fitting both cylinders and forming a power-chamber in the smaller cylinder, a compression-chamber in the larger cylinder, and an annular compression-chamber between the walls of the piston and the walls of the larger cylinder, inlet ports for both compression-chambers, a communicating port between the annular chamber and the entire interior of the piston, a communicating port between the compression-chamber of the larger cylinder and the power-chamber which is independent of the annular chamber, and an exhaust port for the power-chamber, substantially as described.

4. An internal combustion engine comprising tandem communicating cylinders of different diameters, a hollow piston the interior of which is in free communication with the larger cylinder and fitting both cylinders and forming a power-chamber in the smaller cylinder, a compression-chamber in the larger cylinder and interior of the piston, and an annular air compression-chamber between the walls of the piston and the walls of the larger cylinder, inlet ports for both compression-chambers, a communicating port between the annular chamber and the interior of the piston, a deflector located within the piston for directing the air received from the annular chamber against the closed end of the piston, a communicating port between the compression-chamber of the larger cylinder and the power-chamber which is independent of the annular chamber, and an exhaust port for the power-chamber, substantially as described.

5. An internal combustion engine comprising a compression-chamber and a power-chamber, an inlet port for the compression-chamber, a communicating port between the compression and power chambers, an oil-jet located in the communicating port and directed into the power-chamber, a hollow ported feed shaft for supplying the jet, positive means for revolving the shaft to bring the port into communication with the jet, and an exhaust port for the power-chamber, and means for suitably controlling the inlet and exhaust ports and the communicating port, substantially as described.

6. In a two cycle internal combustion engine, the combination with a cylinder and a piston therein, of means to admit air and an explosive charge separately to the cylinder below the piston, and other means to transfer first the air and then the explosive charge to the working end of the cylinder at the end of the power stroke.

7. In a two cycle internal combustion engine, the combination with a cylinder and a piston therein, of means to admit air and an explosive charge separately to the cylinder below the piston with the air next to the piston, and means to transfer first the air and then the explosive charge to the working end of the cylinder at the end of the power stroke.

8. In a two cycle internal combustion engine, the combination with a cylinder and a piston therein, of a closed crank case connected to the cylinder, means to admit air and an explosive charge separately to the crank case chamber, and other means to transfer first the air and then the explosive charge to the working end of the cylinder at the end of the power stroke.

9. In a two cycle internal combustion engine, the combination with a cylinder, of a piston therein, and a closed crank case communicating with one end of the cylinder, means to admit air to the crank case chamber adjacent the piston, means to admit an explosive charge to the lower end of the crank case chamber, and means to transfer first the air and then the explosive charge to the working end of the cylinder at the end of the power stroke.

10. In a two cycle internal combustion engine, the combination with a cylinder, a hollow piston therein and a closed crank case connected with said cylinder, of means to admit air to the interior of the piston, means to admit the explosive charge to the crank case, and other means to transfer said air and explosive charge to the working end of the cylinder at the end of the power stroke.

11. In a two-cycle internal combustion engine, the combination with a cylinder, of a hollow piston therein, a crank case connected to the lower end of the cylinder, said cylinder having an air admission port and a separate port for the admission of an explosive charge both leading to the space beneath the piston, a deflector for deflecting the charge of air into the upper part of the piston, and means to transfer to the working end of the cylinder first the air and then the explosive charge.

12. In a two-cycle internal-combustion engine, the combination with a cylinder having an air-inlet port and another port for the admission of an explosive charge, of a piston in the cylinder, said piston having a port to register with the air-port, and a communicating port through which the air and explosive charge are transferred to the working end of the cylinder, said piston having an outlet port to register with the communicating port at the end of the power stroke, substantially as described.

Signed by me at New York, N. Y., this 8th day of December, 1906.

WILLIAM HARPER, JR.

Witnesses:
THOMAS EWING, JR.,
SAMUEL W. BALCH.